(12) United States Patent
Kosonovsky (10) Patent No.: US 9,158,433 B1
(45) Date of Patent: Oct. 13, 2015

(54) GRAPHICAL USER INTERFACE TEXT SELECTION AND PROCESSING IN CLIENT APPLICATIONS EMPLOYING A SCREEN-AT-A-TIME BASED COMMUNICATION PROTOCOL

(71) Applicant: CA, Inc., Islandia, NY (US)

(72) Inventor: Igor Kosonovsky, Toronto (CA)

(73) Assignee: CA, Inc., New York, NY (US)

( * ) Notice: Subject to any disclaimer, the term of this patent is extended or adjusted under 35 U.S.C. 154(b) by 212 days.

(21) Appl. No.: 13/783,979

(22) Filed: Mar. 4, 2013

(51) Int. Cl.
*G06F 3/0482* (2013.01)

(52) U.S. Cl.
CPC .................... *G06F 3/0482* (2013.01)

(58) Field of Classification Search
CPC .................................................. G06F 3/0484
USPC ......................................... 715/738, 810, 863
See application file for complete search history.

(56) References Cited

U.S. PATENT DOCUMENTS

| | | | | |
|---|---|---|---|---|
| 5,444,841 | A * | 8/1995 | Glaser et al. | 715/224 |
| 6,938,220 | B1 * | 8/2005 | Shigematsu et al. | 715/863 |
| 7,221,376 | B2 * | 5/2007 | Iwema et al. | 345/619 |
| 7,246,320 | B2 * | 7/2007 | Foucher et al. | 715/739 |
| 7,864,195 | B2 * | 1/2011 | Rimas et al. | 345/619 |
| 8,195,641 | B2 * | 6/2012 | Rucker et al. | 707/713 |
| 8,606,326 | B2 * | 12/2013 | Oh et al. | 455/566 |
| 8,786,559 | B2 * | 7/2014 | Hogan | 345/173 |
| 8,832,585 | B2 * | 9/2014 | Missig et al. | 715/778 |
| 8,982,045 | B2 * | 3/2015 | Hinckley et al. | 345/156 |
| 8,990,733 | B2 * | 3/2015 | Deutsch et al. | 715/835 |
| 9,041,677 | B2 * | 5/2015 | Kim | 345/173 |
| 2004/0046787 | A1 * | 3/2004 | Henry et al. | 345/744 |
| 2010/0049989 | A1 * | 2/2010 | Lee | 713/189 |
| 2010/0103124 | A1 * | 4/2010 | Kruzeniski et al. | 345/173 |
| 2011/0163968 | A1 * | 7/2011 | Hogan | 345/173 |
| 2011/0231796 | A1 * | 9/2011 | Vigil | 715/810 |

OTHER PUBLICATIONS

Personal Communications for Windows, Version 5.7, 3270 Emulator User's Reference, Third Edition, Sep. 2003, International Business Machines Corporation, 1989 and 2003, 92 pages.
Richard G. Ellis, "3270 Emulators and Pointer Enabled Tools", vm.uconn.edu/~pets/emulator.html accessed Jan. 16, 2013, Jul. 18, 2001, 6 pages.
Tom Brennan Software, "Vista tn3270", www.tombrennansoftware.com/select accessed Oct. 26, 2012, page created Jul. 20, 1999, 2 pages.

\* cited by examiner

*Primary Examiner* — David Phantana Angkool
(74) *Attorney, Agent, or Firm* — Myers Bigel Sibley & Sajovec, P.A.

(57) ABSTRACT

Methods of interfacing with a terminal based operating system include receiving a block of text including a plurality of lines of text, displaying the block of text on a terminal window, presenting a selection cursor on the displayed block of text at a cursor location on the terminal window, wherein a size of the block of text is equal to a screen size of the terminal window, receiving a cursor selection while the cursor is positioned at the cursor location, presenting a menu including menu options corresponding to available actions that can be taken, receiving a command corresponding to one of the menu options, identifying a text object associated with the cursor location wherein a size of the block of text is equal to a screen size of the terminal window, and executing the one of the menu options on the text object.

20 Claims, 8 Drawing Sheets

```
SYSVIEW 13.5 CALL --------- OUTPUT, Job Output ------------ 09/14/12 14:53:34
Command ==>                                           Scroll *===> CSR
-------------------------------------------------------------- Lvl 4 Row 31-45/45
JobName JobID    Queue       StepName     ProcStep      ExecSys
IK55    STC43631 EXECUTE     JESJCL       JES2          CA11
-------------------------------------------------------------------------
...+....10...+....20...+....30...+....40...+....50...+....60...+....70...+....
        7  ++STEPLIB     DD     DSN=CYB1.IK56.SSCPLINK,DISP=SHR
           ++*TEPLIB     DD     DSN=APCDAL.MSPS.ESP114.DEV.CDYLOAD, DISP=SHR
        8  ++STEPLIB     DD     DSN=&PREFIX..PARMLIB(ESPPARM),DISP=SHR
           IEFC653I SUBSTITUTION JCL - DSN=CYB1.IK55.PARMLIB(ESPPARM), DISP=SHR
        9  ++ESPCOLD     DD     DSN=&PREFIX..PARMLIB(ESPCOLD),DISP=SHR
           IEFC653I SUBSTITUTION JCL - DSN=CYB1.IK55.PARMLIB(ESPCOLD),DISP=SHR
       10  ++ESPWARM     DD     DSN=&PREFIX..PARMLIB(ESPWARM),DISP=SHR
           IEFC653I SUBSTITUTION JCL - DSN=CYB1.IK55.PARMLIB(ESPWARM),DISP=SHR
       11  ++SYSTCPD     DD     DSN=SYS1.TCPPARMS(TCPDATA),DISP=SHR
           ++*
       12  ++FOSTOPJ     EXEC   PGM=IEBGENER,COND=EVEN
       13  ++SYSUT1      DD     DSN=KOSIG01.CNTLLIB(FOSTOPJ),DISP=SHR
       14  ++SYSUT2      DD     SYSOUT=(,INTRDR)
       15  ++SYSPRINT    DD     SYSOUT=*
       16  ++SYSIN       DD     DUMMY
*****************************End of Data**********************************
```
— 60A

FIGURE 2A

```
SYSVIEW 13.5 CALL --------- OUTPUT, Job Output ------------ 09/14/12 14:53:34
Command ==>                                           Scroll *===> CSR
-------------------------------------------------------------- Lvl 4 Row 31-45/45
JobName JobID    Queue       StepName     ProcStep      ExecSys    ------------
IK55    STC43631 EXECUTE     JESJCL       JES2          CA11       | 1. Browse  |
------------------------------------------------------------------ | 2. Compress|
...+....10...+....20...+....30...+....40...+....50...+....60...+  | 3. Copy    |
        3  //       EXEC IK55                                      | 4. Delete  |
        4  ++IK55        PROC   PREFIX=CYB1.IK55GA                 | 5. Edit    |
        5  ++  P FOSTOPJ                                           | 6. Email   |
        6  IEFPROC       EXEC   PGM=CYBJS000,                      | 7. FindText|
           ++*EFPROC     EXEC   PGM=XDCCALLA,PARM='CYBJS000',      | 8. ListCat |
           ++            REGION=0M                                 | 9. QW      |
           ++            TIME=1440                                 | 10. Rename |
           ++            DYNAMNBR=200                              | 11. View   |
        7  ++STEPLIB     DD     DSN=CYB1.IK56.SSCPLINK,DISP=SHR    | 12. Job    |
           ++*TEPLIB     DD     DSN=APCDAL.MSPS.ESP114.DEV.CDYLOAD,D| 13. Find   |
        8  ++STEPLIB     DD     DSN=&PREFIX..PARMLIB(ESPPARM),DISP=SH| 14. Custom |
           IEFC653I SUBSTITUTION JCL - DSN=CYB1.IK55.PARMLIB(ESPPARM),DISP=SHR
        9  ++ESPCOLD     DD     DSN=&PREFIX..PARMLIB(ESPCOLD),DISP=SHR
           IEFC653I SUBSTITUTION JCL - DSN=CYB1.IK55.PARMLIB(ESPCOLD),DISP=SHR
       10  ++ESPWARM     DD     DSN=&PREFIX..PARMLIB(ESPWARM),DISP=SHR
           IEFC653I SUBSTITUTION JCL - DSN=CYB1.IK55.PARMLIB(ESPWARM),DISP=SHR
       11  ++SYSTCPD     DD     DSN=SYS1.TCPPARMS(TCPDATA),DISP=SHR
           ++*
       12  ++FOSTOPJ     EXEC   PGM=IEBGENER,COND=EVEN
       13  ++SYSUT1      DD     DSN=KOSIG01.CNTLLIB(FOSTOPJ),DISP=SHR
       14  ++SYSUT2      DD     SYSOUT=(,INTRDR)
       15  ++SYSPRINT    DD     SYSOUT=*
       16  ++SYSIN       DD     DUMMY
*****************************End of Data**********************************
```
— 60B, 55

```
SYSVIEW 13.5 CALL -------- OUTPUT, Job Output ------------ 09/14/12 14:53:34
Command ==>                                             Scroll *===> CSR
-------------------------------------------------------- Lvl 4 Row 31-45/45
JobName JobID    Queue      StepName     ProcStep     ExecSys   ------------
IK55    STC43631 EXECUTE    JESJCL       JES2         CA11    | 1. Browse   |
----------------------------------------------------------    | 2. Compress|
...+....10...+....20...+....30...+....40...+....50...+....60...+  | 3. Copy     |
         3  //     EXEC IK55                                  | 4. Delete   |
         4  ++IK55    PROC  PREFIX=CYB1.IK55GA                | 5. Edit     |
         5  ++ P FOSTOPJ                                      | 6. Email    |
         6  IEFPROC   EXEC  PGM=CYBJS000,                     | 7. FindText|
            ++*EFPROC EXEC  PGM=XDCCALLA,PARM='CYBJS000',     | 8. ListCat |
            ++              REGION=0M                         | 9. QW       |
            ++              TIME=1440                         |10. Rename   |
            ++              DYNAMNBR=200                      |11. View     |
         7  ++STEPLIB  DD   DSN=CYB1.IK56.SSCPLINK,DISP=SHR   |12. Job      |
            ++*TEPLIB  DD   DSN=APCDAL.MSPS.ESP114.DEV.CDYLOAD,D |13. Find  |
         8  ++STEPLIB  DD   DSN=&PREFIX..PARMLIB(ESPPARM),DISP=Snn |14. Custom|
            IEFC653I SUBSTITUTION JCL - DSN=CYB1.IK55.PARMLIB(ESPPARM),DISP=SHR
         9  ++ESPCOLD  DD   DSN=&PREFIX..PARMLIB(ESPCOLD),DISP=SHR
            IEFC653I SUBSTITUTION JCL - DSN=CYB1.IK55.PARMLIB(ESPCOLD),DISP=SHR
        10  ++ESPWARM  DD   DSN=&PREFIX..PARMLIB(ESPWARM),DISP=SHR
            IEFC653I SUBSTITUTION JCL - DSN=C/B1.IK55.PARMLIB(ESPWARM),DISP=SHR
        11  ++SYSTCPD  DD   DSN=SYS1.TCPPARMS(TCPDATA),DISP=SHR
            ++*
        12  ++FOSTOPJ  EXEC PGM=IEBGENER,COND=EVEN
        13  ++SYSUT1   DD   DSN=KOSIG01.CNTLLIB(FOSTOPJ),DISP=SHR
        14  ++SYSUT2   DD   SYSOUT=(,INTRDR)
        15  ++SYSPRINT DD   SYSOUT=*
        16  ++SYSIN    DD   DUMMY
****************************End of Data****************************************
```

FIGURE 7A

```
SYSVIEW 13.5 CALL -------- OUTPUT, Job Output ------------ 09/14/12 14:53:34
Command ==>                                             Scroll *===> CSR
-------------------------------------------------------- Lvl 4 Row 31-45/45
JobName JobID    Queue      StepName     ProcStep     ExecSys   ------------
IK55    STC43631 EXECUTE    JESJCL       JES2         CA11    | 1. Browse   |
----------------------------------------------------------    | 2. Compress|
...+....10...+....20...+....30...+....40...+....50...+....60...+  | 3. Copy     |
         3  //     EXEC IK55                                  | 4. Delete   |
         4  ++IK55    PROC  PREFIX=CYB1.IK55GA                | 5. Edit     |
         5  ++ P FOSTOPJ                                      | 6. Email    |
         6  IEFPROC   EXEC  PGM=CYBJS000,                     | 7. FindText|
            ++*EFPROC EXEC  PGM=XDCCALLA,PARM='CYBJS000',     | 8. ListCat |
            ++              REGION=0M                         | 9. QW       |
            ++              TIME=1440                         |10. Rename   |
            ++              DYNAMNBR=200                      |11. View     |
         7  ++STEPLIB  DD   DSN=CYB1.IK56.SSCPLINK,DISP=SHR   |12. Job      |
            ++*TEPLIB  DD   DSN=APCDAL.MSPS.ESP114.DEV.CDYLOAD,D |13. Find  |
         8  ++STEPLIB  DD   DSN=&PREFIX..PARMLIB(ESPPARM),DISP=Snn |14. Custom|
            IEFC653I SUBSTITUTION JCL - DSN=CYB1.IK55.PARMLIB(ESPPARM),DISP=SHR
         9  ++ESPCOLD  DD   DSN=&PREFIX..PARMLIB(ESPCOLD),DISP=SHR
            IEFC653I SUBSTITUTION JCL - DSN=CYB1.IK55.PARMLIB(ESPCOLD),DISP=SHR
        10  ++ESPWARM  DD   DSN=&PREFIX..PARMLIB(ESPWARM),DISP=SHR
            IEFC653I SUBSTITUTION JCL - DSN=CYB1.IK55.PARMLIB(ESPWARM),DISP=SHR
        11  ++SYSTCPD  DD   DSN=SYS1.______________________________________
            ++*                        | |||||||||||||||||||||||||||||||| |
        12  ++FOSTOPJ  EXEC PGM=IEBGENER,COND=EVEN
        13  ++SYSUT1   DD   DSN=KOSIG01.CNTLLIB(FOSTOPJ),DISP=SHR
        14  ++SYSUT2   DD   SYSOUT=(,INTRDR)
        15  ++SYSPRINT DD   SYSOUT=*
        16  ++SYSIN    DD   DUMMY
****************************End of Data****************************************
```

FIGURE 7B

```
SYSVIEW 13.5 CALL -------- OUTPUT, Job Output ------------ 09/14/12 14:53:34
Command ==>                                            Scroll *===> CSR
-------------------------------------------------------------- Lvl 4 Row 31-45/45
JobName JobID    Queue        StepName     ProcStep     ExecSys  ______________
IK55    STC43631 EXECUTE      JESJCL       JES2         CA11    | 1. Browse   |
--------------------------------------------------------------  | 2. Compress |
...+....10...+....20...+....30...+....40...+....50...+....60...+| 3. Copy     |
        3  //   EXEC IK55                                       | 4. Delete   |
        4  ++IK55    PROC   PREFIX=CYB1.IK55GA                  | 5. Edit     |
        5  ++ P FOSTOPJ                                         | 6. Email    |
        6  IEFPROC   EXEC   PGM=CYBJS000,                       | 7. FindText |
           ++*EFPROC EXEC   PGM=XDCCALLA,PARM='CYBJS000',       | 8. ListCat  |
           ++              REGION=0M                            | 9. QW       |
           ++              TIME=1440                            | 10. Rename  |
           ++              DYNAMNBR=200                         | 11. View    |
        7  ++STEPLIB  DD      DSN=CYB1.IK56.SSCPLINK,DISP=SHR   | 12. Job     |
           ++*TEPLIB  DD      DSN=APCDAL.MSPS.ESP114.DEV.CDYLOAD,D| 13. Find   |
        8  ++STEPLIB  DD      DSN=&PREFIX..PARMLIB(ESPPARM),DISP=S| 14. Custom |
           IEFC653I SUBSTITUTION JCL - DSN=CYB1.IK55.PARMLIB(ESPPARM),DISP=SHR
        9  ++ESPCOLD  DD      DSN=&PREFIX..PARMLIB(ESPCOLD),DISP=SHR
           IEFC653I SUBSTITUTION JCL - DSN=CYB1.IK55.PARMLIB(ESPCOLD),DISP=SHR
       10  ++ESPWARM  DD      DSN=&PREFIX..PARMLIB(ESPWARM),DISP=SHR
           IEFC653I SUBSTITUTION JCL - DSN=CYB1.IK55.PARMLIB(ESPWARM),DISP=SHR
       11  ++SYSTCPD  DD      DSN=SYS1.
           ++*
       12  ++FOSTOPJ  EXEC   PGM=IEBGENER,COND=EVEN
       13  ++SYSUT1   DD      DSN=KOSIG01.CNTLLIB(FOSTOPJ),DISP=SHR
       14  ++SYSUT2   DD      SYSOUT=(,INTRDR)
       15  ++SYSPRINT DD      SYSOUT=*

*********************************End of Data*********************************
```

FIGURE 7C

```
SYSVIEW 13.5 CALL -------- OUTPUT, Job Output ------------ 09/14/12 14:53:34
Command ==>                                            Scroll *===> CSR
-------------------------------------------------------------- Lvl 4 Row 31-45/45
JobName JobID    Queue        StepName     ProcStep     ExecSys
IK55    STC43631 EXECUTE      JESJCL       JES2         CA11
--------------------------------------------------------------
...+....10...+....20...+....30...+....40...+....50...+....60...+
        3  //   EXEC IK55
        4  ++IK55    PROC   PREFIX=CYB1.IK55GA
        5  ++ P FOSTOPJ
        6  IEFPROC   EXEC   PGM=CYBJS000,
           ++*EFPROC EXEC   PGM=XDCCALLA,PARM='CYBJS000',
           ++              REGION=0M
           ++              TIME=1440
           ++              DYNAMNBR=200
        7  ++STEPLIB  DD      DSN=CYB1.IK56.SSCPLINK,DISP=SHR
           ++*TEPLIB  DD      DSN=APCDAL.MSPS.ESP114.DEV.CDYLOAD,DISP=SHR
        8  ++STEPLIB  DD      DSN=&PREFIX..PARMLIB(ESPPARM),DISP=SHR
           IEFC653I SUBSTITUTION JCL - DSN=CYB1.IK55.PARMLIB(ESPPARM),DISP=SHR
        9  ++ESPCOLD  DD      DSN=&PREFIX..PARMLIB(ESPCOLD),DISP=SHR
           IEFC653I SUBSTITUTION JCL - DSN=CYB1.IK55.PARMLIB(ESPCOLD),DISP=SHR
       10  ++ESPWARM  DD      DSN=&PREFIX..PARMLIB(ESPWARM),DISP=SHR
           IEFC653I SUBSTITUTION JCL - DSN=CYB1.IK55.PARMLIB(ESPWARM),DISP=SHR
       11  ++SYSTCPD  DD      DSN=SYS1.TCPPARMS(TCPDATA),DISP=SHR
           ++*
       12  ++FOSTOPJ  EXEC   PGM=IEBGENER,COND=EVEN
       13  ++SYSUT1   DD      DSN=KOSIG01.CNTLLIB(FOSTOPJ),DISP=SHR
       14  ++SYSUT2   DD      SYSOUT=(,INTRDR)
       15  ++SYSPRINT DD      SYSOUT=*
       16  ++SYSIN    DD      DUMMY
*********************************End of Data*********************************
```

FIGURE 7D

GRAPHICAL USER INTERFACE TEXT SELECTION AND PROCESSING IN CLIENT APPLICATIONS EMPLOYING A SCREEN-AT-A-TIME BASED COMMUNICATION PROTOCOL

BACKGROUND

The present disclosure relates to computer systems, and more specifically, to client/server based computer systems in which information is transmitted to a client application in a screen-at-a-time based communication protocol.

In client/server computing environments, a client application obtains computing services from a server application, which may, for example, be hosted by a remote server. The client/server model of computing was originally developed to permit so-called "dumb" terminals to provide access to computing resources provided by mainframe computers. The function of the terminal was to receive user input, transmit a request to a mainframe computer, receive a response from the mainframe computer, and format and display data contained in the response for the user. The terminal was not required, and indeed often not able, to perform any substantial data processing.

In many instances, dumb terminals have been replaced with powerful personal computers, including desktop computers, laptop computers, mobile computing devices, etc. However, even with the availability of substantial processing power at the terminal level, client/server computing is still an important computing paradigm, due to the popularity of web-based applications, the utility of the hypertext transfer protocol, and the need to access remote databases for information. Furthermore, many mainframe applications are still in use worldwide. In order to access such applications, terminal emulator programs that can be used to access mainframe computers from personal computers are widely available. For example, a 3270 emulator is a computer program that duplicates the functions of an IBM 3270 mainframe computer terminal.

The IBM 3270 terminal interface is a standard interface designed to enable a terminal to communicate with mainframe computers. Due to restrictions on the memory and computational capacity of early mainframes, as well as restrictions on the amount of bandwidth available for communicating with terminals, the 3270 terminal interface was designed to minimize the amount of data transmitted between the terminal and the mainframe, and to minimize the frequency of interrupts presented to the mainframe.

To address these goals, the IBM 3270 terminal interface was designed to support a "screen-at-a-time" communications model with the terminal. In a "screen-at-a-time" communication model, the mainframe computer transmits an entire screen of data to the terminal at once. The terminal then formats and displays the screen of data for the user according to the 3270 interface. The standard 3270 screen consists of 24 lines of 80 characters each, for a total of 1920 characters. Other 3270 screen sizes were defined, such as 32×80, 43×80 and 27×132.

A screen of 3270 data transmitted from a mainframe to a terminal is referred to as a "data stream," which is essentially a large block of data. Transferring data in large blocks reduces the number of I/O interrupts that the mainframe must handle. A data stream includes both text and control characters, which allows the terminal to "paint" an entire screen in a single operation. The screen may be divided into clusters of contiguous character cells for which various attributes can be set, such as color, highlighting, character set, protection, etc.

The 3270 interface defines a "read buffer" method that transfers the entire contents of the 3270-screen buffer, including field attributes, to the mainframe. This method is primarily used for debugging purposes. To reduce the amount of data that is transmitted back to the mainframe, the 3270 interface also defines a "read modified" method that transfers back to the mainframe only changes from one or more formatted fields that have been modified by the user, but without sending any unmodified fields or static data. This technique reduces the amount of data that needs to be transmitted, and thereby increases the number of terminals that a mainframe can support.

The Interactive System Productivity Facility (ISPF) is a software product for the z/OS operating system that runs on IBM mainframes. ISPF provides an IBM 3270 terminal interface by means of a set of panels. Each panel may include menus and/or dialogs that provide a user interface. This interface allows a user to execute tools on the mainframe in an underlying time sharing environment using, for example, the Time Sharing Option (TSO) facility. ISPF is frequently used to manipulate z/OS files, referred to as "data sets," via its Program Development Facility (ISPF/PDF).

While the 3270 interface meets the requirements of low bandwidth and reduced frequency of interrupts that were required for early mainframes, it was defined before the mouse-based graphical user interface (GUI) became popular for use in personal computing. As a text-based interface, the 3270 interface requires substantially more keyboard interaction than a GUI, and may be unfamiliar or difficult to operate for users who are more familiar with a graphical user interface.

BRIEF SUMMARY

Some embodiments provide methods of interfacing with a terminal based operating system. The methods include receiving a screen of text including a plurality of lines of text, displaying the screen of text on a terminal window wherein a size of the block of text is equal to a screen size of the terminal window, presenting a selection cursor on the displayed screen of text at a cursor location on the terminal window, receiving a cursor selection while the cursor is positioned at the cursor location, presenting a menu including menu selections corresponding to available actions that can be taken, receiving a command corresponding to one of the menu selections, identifying a type of text object associated with the one of the menu selections, identifying within the displayed block of text, a text object associated with the cursor location that is smaller than the displayed block of text, and executing the one of the menu selections on the text object.

A text object may correspond to the name of a physical or logical object that is defined in an operating environment. For example, in a mainframe environment, an object, such as a job, data set, or message, has an associated name, i.e., a job name, data set name or message ID, respectively. Data set names can be treated as one type of text object, message IDs as another type of text object, and job names as a third type of text object. Moreover, any set of characters that are not associated with a predefined text object type may be treated as a generic text object or string.

Identifying the text object associated with the cursor location may include reading characters in the screen of text from the cursor location toward a beginning of the block of text until a first delimiter character is found, and reading characters in the block of text from the cursor location toward an end of the block of text until a second delimiter character is found, wherein the first delimiter character and the second delimiter character define the text object in the screen of text between the first delimiter character and the second delimiter character.

The methods may further include determining that no text object is associated with the cursor location, parsing the screen of text to identify one or more candidate text objects having predetermined text object characteristics within the screen of text, and highlighting the candidate text objects on the screen.

In some embodiments, the methods may further include identifying a type of the text object. A sub-menu may be presented that includes menu selections corresponding to actions that can be taken with respect to the identified type of text object.

Related systems and computer program products are also disclosed.

BRIEF DESCRIPTION OF THE DRAWINGS

Aspects of the present disclosure are illustrated by way of example and are not limited by the accompanying figures with like references indicating like elements.

FIGS. 2A and 2B are example screenshots of screens from a terminal emulator in accordance with some embodiments.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1A:
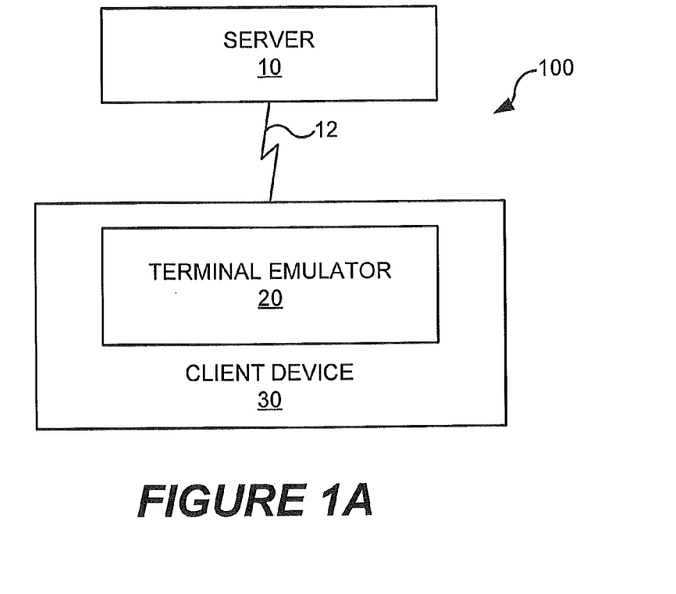
FIG. 1A is a block diagram of a system including a mainframe computer and a terminal running a terminal emulator.
Figure 1B:
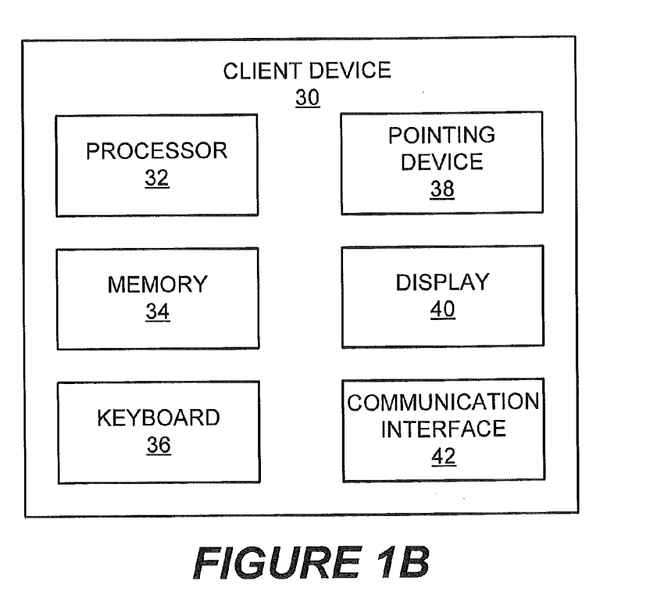
FIG. 1B is a block diagram of a terminal that can be configured to run a terminal emulator.

FIG. 1A is a block diagram of a system including a mainframe computer and a terminal running a terminal emulator, and FIG. 1B is a block diagram of a terminal that can be configured to run a terminal emulator.

Referring now to FIG. 1A, a client/server computing system 100 includes a server 10 and client device 30. The server 10 may be, for example, a mainframe computer that runs a mainframe operating system, such as z/OS, OS/390, MVS, VSE, VM, UNIX, etc. The server 10 may support a variety of applications, such as Customer Information Control System (CICS), Information Management System (IMS), DB2, Resource Access Control Facility (RACF), Systems Network Architecture (SNA), WebSphere MQ, REXX, CLIST, SMP/E, Job Control Language (JCL), Time Sharing Option (TSO/E), Interactive System Productivity Facility (ISPF), and others.

The client device 30 is coupled to the server 10 over a communication channel 12, and accesses application programs running on the server using a terminal emulator program 20. In some embodiments, the terminal emulator program may include a 3270 terminal emulator. However, the terminal emulator program 20 may emulate other types of terminals, such as VT100, VT220, VT320, IBM 3278/9/E, IBM 5250, IBM 3179G, Data General D211, Hewlett Packard HP700/92, Sperry/Unisys 2000-series UTS60, Burroughs/Unisys A-series T27/TD830/ET1100, ADDS ViewPoint, Sun console, QNX, AT386, SCO-ANSI, SNI 97801, Televideo, and Wyse 50/60.

Referring to FIG. 1B, a client device 30 may include a processor 32, a display 40, a keyboard 36 and a pointing device 38, such as a mouse or touchpad. The client device 30 may further include a memory 34 in which a terminal emulator module 20 may reside and a communication interface 42 for connecting with the server 10 over the communication channel 12.

As discussed above, in many mainframe computing scenarios, the server 10 communicates with the terminal emulator 20 using a "screen-at-a-time" communication model. Such a model is used, for example, in the Interactive System Productivity Facility (ISPF) software product for the z/OS operating system. In the following discussion, ISPF is used as an example of a program in which the described embodiments can be employed by accessing a mainframe running the z/OS operating system using a 3270 terminal emulator. However, the present invention is not limited to use with ISPF, the z/OS operating system, or 3270 terminal emulators.

As noted above, a screen of text is received by the terminal emulator 20 and presented to a user on the terminal display 40. In ISPF, for example, the screen or panel of text presented to the user may be a job log, program or JCL source code, or some other text listing. Often, the user needs to do something with a data set whose name appears within the text. For example, a user may wish to edit, browse or send a data set whose name appears within the text.

Previously, to browse a data set it was necessary to type its name at the command prompt and then copy the name (using, for example, a cut-and-paste or copy-and-paste operation) into the DSNAME field of the ISPF panel, which is specifically designed for a data set browse operation. Alternatively, a BROWSE command may be implemented as a CLIST or REXX program that use a file name as a parameter. However, the user would still have to type the command name itself as well as append it with a data set name parameter (again by typing it or using a cut-and-paste or copy-and-paste operation). Moreover, a cut- or copy-and-paste operation typically involves three operations, namely, highlighting a string, cutting or copying the string, and pasting the string. In contrast, in some embodiments of the present invention, an action, such as FIND, can be invoked on a string with minimal user input.

A number of actions can be performed on a data set in a mainframe environment, such as browse, edit, rename, delete, compress, copy, email and others. It may become overly complicated to maintain a set of commands for performing these actions, and to require a user to remember the commands and type them into the terminal when needed. Also, it may be redundant to require a user to type a data set name and then use cut- or copy-and-paste when the data set name is on the screen already.

Similarly, an ISPF panel may include other types of objects, such as messages identified by a Message ID, data sets identified by data set name, jobs identified by job name, generic strings, etc. A user may desire to interact with a message displayed on an ISPF screen. For example, a user may wish to look up the definition of a particular message by its Message ID.

Some embodiments provide easier, more intuitive methods of interacting with objects, such as data set names, displayed on an ISPF panel. Some embodiments may accomplish a desired data set operation with only two subsequent mouse clicks or keypresses. All that is needed is to place a cursor on data set name, click to invoke the tool, select a desired action, and click to proceed.

Embodiments may be implemented as an ISPF application that provides capabilities similar to ISPF "point-and-shoot" or "point-and-click" capabilities in a terminal emulator that supports screen-at-a-time communications. While every ISPF point-and-shoot field is in fact a static text object predefined in certain place of a certain panel, some embodiments may support dynamic text objects anywhere on any ISPF panel that need not be predefined. Some embodiments may enable users to quickly access and execute system tools for the objects whose names are displayed on the screen. Moreover, some embodiments may provide access to commands and system tools that apply to various types of objects from a single menu.

Some embodiments may present a menu of options that can be selected by the user that can be executed on the selected text object. For example, a menu could include menu options shown in Table 1 below, or others.

TABLE 1

Data Set Actions
Actions

| | |
|---|---|
| 1. | Browse |
| 2. | Edit |
| 3. | View |
| 4. | Rename |
| 5. | Compress |
| 6. | Delete |
| 7. | Copy |
| 8. | Find Text |
| 9. | List Cat |
| 10. | Quick Ref |
| 11. | Email |
| 12. | Job |
| 13. | Find |
| 14. | Custom |

TABLE 1-continued

Data Set Actions
Actions

Actions for data set names may include any action number between 1 to 9 and number 11.

Option number 10 (Quick Ref) is applicable for message IDs only. Option 12 (Job) may list all jobs with the same name but different job ID, with subsequent option to HOLD, RELEASE, CANCEL, etc., the particular job. Option 13 (Find) may be selected to find a string appointed by the cursor. Option 14 (Custom), may be selected to capture a string as is done for the FIND command, but then perform an action which a user has associated with that specific option (e.g., a customer written program).

A text object on a display screen can be selected by clicking within the text object. This event starts the application. The click may include, for example, clicking a right or left mouse button on a pointing device 38, activating a roll-up wheel on a pointing device 38, or any other type of input that can be received by a mouse, trackpad, trackball, keyboard or other user interface device.

Some embodiments may enable a user to invoke time-saving shortcuts that reduce the amount of typing that must be done to accomplish a desired task. These embodiments may enable the creation of effective shortcuts, which may increase the usage and convenience of system tools. In particular, some embodiments provide a screen-at-a-time communication system to present an interface to a user that is similar to the GUI style of navigation.

Some embodiments may provide usability enhancements compared to conventional ISPF approaches that require predefined fields and buttons to be selected on an ISPF panel. Such fields and buttons must be predefined within the panel definition, and may not provide flexibility for a user.

Other attempts at providing a GUI-like feel to an ISPF application have required static text definitions in a button definition file (BDF), and can only be used to select predefined portions of a screen.

In contrast, some embodiments allow a user to select various different types of objects from any part of an ISPF panel. The locations and objects that can be selected need not be predefined, which means that dynamic text can be selected from any part of any panel.

FIGS. 2A and 2B are example screenshots of screens 50A, 50B from a terminal emulator in accordance with some embodiments. The screens, or panels, include various information including a header, a command prompt below the header, a banner below the header displaying information about the current job, and a list of output messages relating to the job below the banner. Each line of the output messages may include a Message ID and may reference one or more objects, such as data set names and parameters. For example, referring to FIG. 2A, in the first screen 50A, line 8 of the output contains the following string:

IEFC653I SUBSTITUTION JCL—DSN=CYB1.IK55.PARMLIB(ESPPARM), DISP=SHR

This string includes a Message ID (IEFC653I) and a data set name (CYBLIK55.PARMLIB) with a parameter specified as ESPPARM. Referring still to FIG. 2A, a user may wish to perform an operation on the data set specified in line 8 (CYBLIK55.PARMLIB). The user may position a pointer cursor, such as a mouse cursor, somewhere over the text of the data set name or parameter. For example, as shown in FIG. 2A, the user may position the pointer cursor over the first 'P' in the word (ESPPARM) in the data set name parameter field for the data set CYB1.IK55.PARMLIB, as indicated by the highlight box around the selected letter.

The user may then select the object by, for example, clicking on the object. Referring to FIG. 2B, some embodiments may automatically identify an object associated with the location at which the pointer cursor was positioned. These embodiments may re-draw the screen as now screen 50B with the recognized object highlighted. The user may be presented on the new screen 50B with a menu 55 showing various actions that can be taken with respect to the identified object, including, for example, Browse, Compress, Copy, Delete, etc.

In some embodiments, the menu options presented in the menu 55 may be the same regardless of what type of object is highlighted. For example, many types of objects can be subjected to the same actions, such as Browse, Delete, etc. Some actions can only be taken with respect to particular types of objects, however. For example, the QW command can only be executed against a message object.

Systems/methods according to some embodiments may check the type of object selected before executing the selected command to ensure that the selected command is appropriate for the selected object. In the event the user attempts to executed a command that is not appropriate for the selected object, the systems/methods may return an error message to the user without attempting to execute the command. These systems/methods may therefore provide increased reliability and be less prone to crashing than systems in which the user is required to accurately type in a string of text.

In some embodiments, the systems/methods may generate and present a list of menu options to the user. The list of options may be independent of the object type. The object type may be inferred from the menu option selected by the user.

In some cases, following an option selection in the primary menu, a sub-menu can be displayed that includes options specific to the object type. The systems/methods may automatically recognize the type of object that is displayed on the screen, for example, based on the cursor location and/or menu selection, and may re-draw the screen to display the sub-menu of type-specific options.

In some embodiments, when a job name object is identified, the system identifies the object as a job, and presents a submenu of options to the user that includes only actions that can be taken on a job object. That is, the sub-menu presented to the user may not contain any actions that cannot be taken against a job object. For example, when a job action is selected, "JOB" the following sub menu can be displayed:
  HOLD
  RELEASE
  CANCEL In some embodiments, the systems/methods may be configured up on receipt of an alternate pointer selection, such as a right mouse click, to search through the current screen for any recognizable objects and highlight all recognizable objects on the screen. Objects can be recognized, for example, by unique delimiters used for particular types of objects. Stated differently, the systems/methods may parse the screen data to identify objects of various types that are displayed on the screen. The systems/methods may highlight the identified objects to make their selection easier for the user.

In other embodiments, the systems/methods may automatically highlight the entirety of any object on the screen over which the pointer cursor is positioned. Thus, for example, if the pointer cursor is hovered over the word ESP- PARM in the data set name parameter field for the data set CYB1.IK55.PARMLIB, the systems/methods may identify and highlight the entire data set name before the user selects the data set. This may provide a visual indication to the user of the object that will be selected if the user activates the pointer selection (e.g., clicks on the letter).

Figure 3:
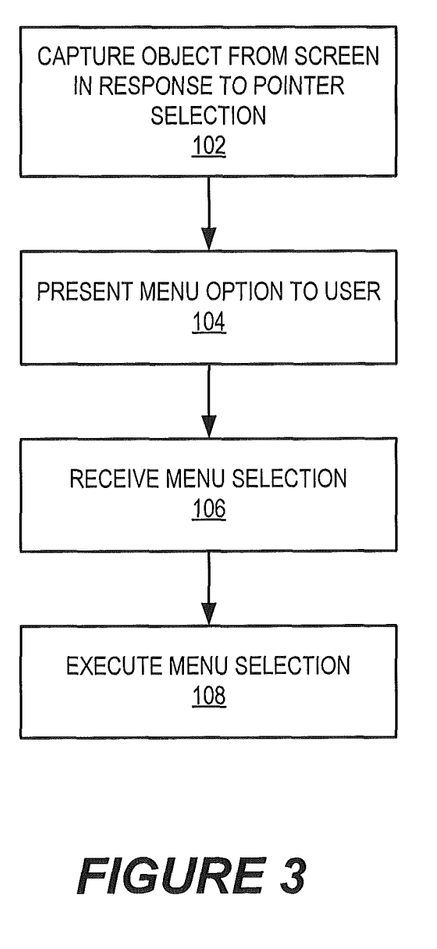
FIGS. 3-6 are flowcharts illustrating systems/methods/computer program products according to some embodiments.
Figure 4:
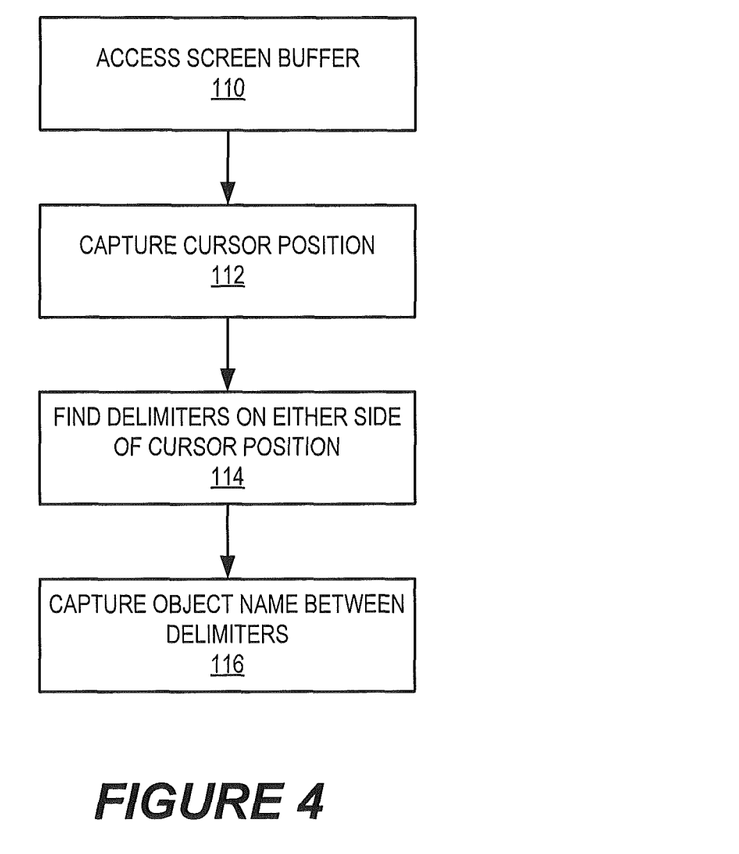

FIGS. 3-6 are flowcharts illustrating systems/methods/computer program products according to some embodiments. Referring to FIG. 3, some embodiments present one or more menu options to the user (block 102) and wait for a menu selection by the user (block 104. The embodiments then capture, or identify, an object from a screen in response to a pointer selection by the user (block 106). Once the menu selection is received, the embodiments attempt to execute the action against the selected object (block 108).

In some embodiments, identification of a text object type can be done by analyzing an action requested from the selection menu. For example, if a 'BROWSE' command is selected from the selection menu, then the object type is determined to be a dataset. If a 'QW' (quick reference) command is selected, then the object type is determined to be a message ID. If a 'JOB' command is selected, then the object type is determined to be a job name. If a 'FIND' command requested, then the object type is determined to be a generic string.

In some embodiments, the object can be captured after the menu selection is received.

The object may be captured based examining text around the location of the cursor pointer when the pointer and menu selection is made. Many types of objects have restrictions in the types of characters that can be included in the object name. For example, data set names may only include the letters a . . . z and A . . . Z, the numbers 0 . . . 9, and the characters ".", "@", "#" and "$". Any number other than these, such as "=", "(", ")", a blank space, etc., may be considered a delimiter. Accordingly, referring to FIG. 4, capturing the object associated with a cursor location may include accessing a buffer of screen data associated with the currently displayed screen (block 110), capturing the current position of the pointer cursor (block 112), searching for delimiter characters on either side of the screen position (block 114), and capturing the object name between the delimiters (block 116). In some embodiments, when the delimiters are parentheses, the systems/methods may assume that the object within parentheses is a parameter of another object immediately to the left of the parentheses. The systems/methods may then expand the search to the left of the leftmost delimiter to try to identify an object.

The following list of delimiters may be used for various object types:

Data set name delimiters: {!%^&*-_+=\|/:;?,< >[ ]""}
Job name delimiters: {!%^&-_+=\|/:;?,< >[ ]""(.)}
Message ID delimiters: {!%^&-_+=\|/:;?,< >[ ]""(.)@#} where blank is not visible character on second position, and braces are included.

For example, referring back to the example shown in FIGS. 2A and 2B, when the cursor was positioned over the word "ESPPARM" within parentheses, the systems/methods may search to the left of the parentheses to find and identify the data set object CYB1.IK55.PARMLIB, and may highlight the entire object including the member name, as illustrated in FIG. 2B. Also, if for example, the "browse" option selected for this object and the cursor is on a member name, the member (named ESPPARM in FIG. 2B) will be opened in browse mode. But if the cursor is positioned to the left of the parentheses, the entire data set CYB1.IK55.PARMLIB will be opened in browse mode, which is a different action.

When a 'FIND' command is requested from the selection menu, it is interpreted as the user's intention to find an indicated string anywhere else within that file. In that case, the first string delimiter is set as the character immediately preceding the cursor location. In order to identify the second delimiter, a graphic prompt scale may be displayed under the target line appointed by the cursor. The graphic scale depicts scale using a one-line pop-up window, with separations marked by smaller intersecting lines, and one separator (vertical bar) per one character. The scale represents the distance from the cursor position. The second delimiter position is identified by the scale separator selection. The scale selection can then be made with just with one operation, i.e. a double click on a selected scale separator.

Figure 7A:
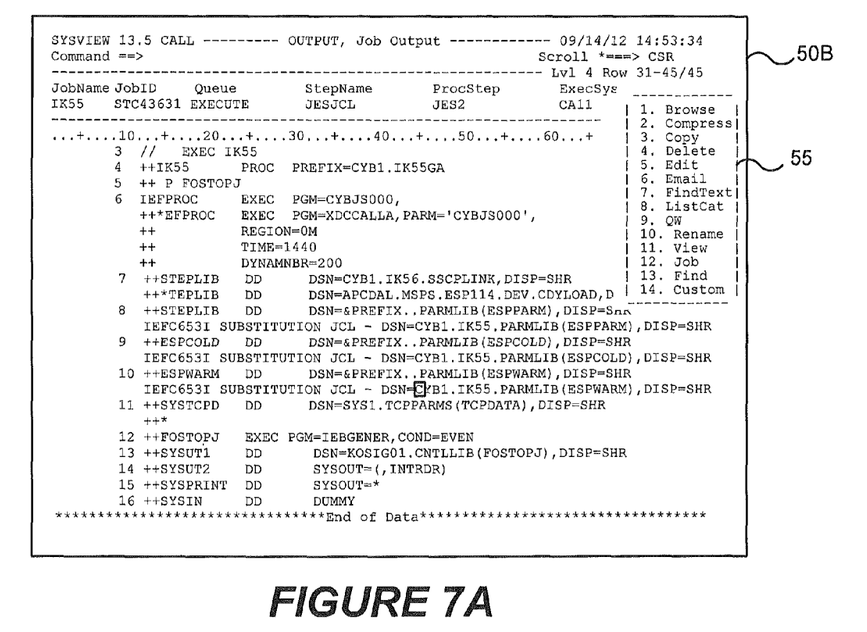
FIGS. 7A to 7D are example screenshots of screens from a terminal emulator in accordance with further embodiments.
Figure 7B:
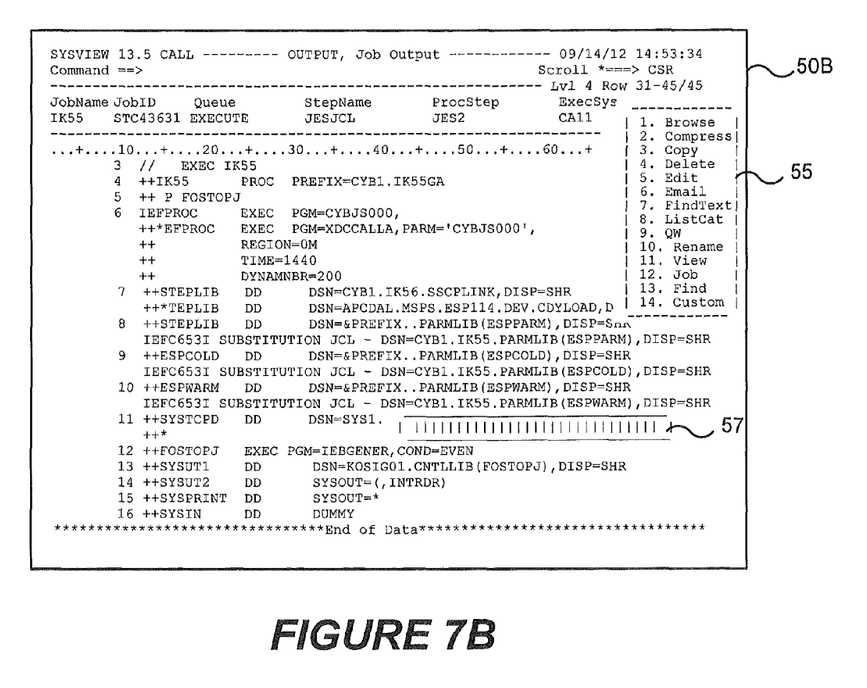
Figure 7C:
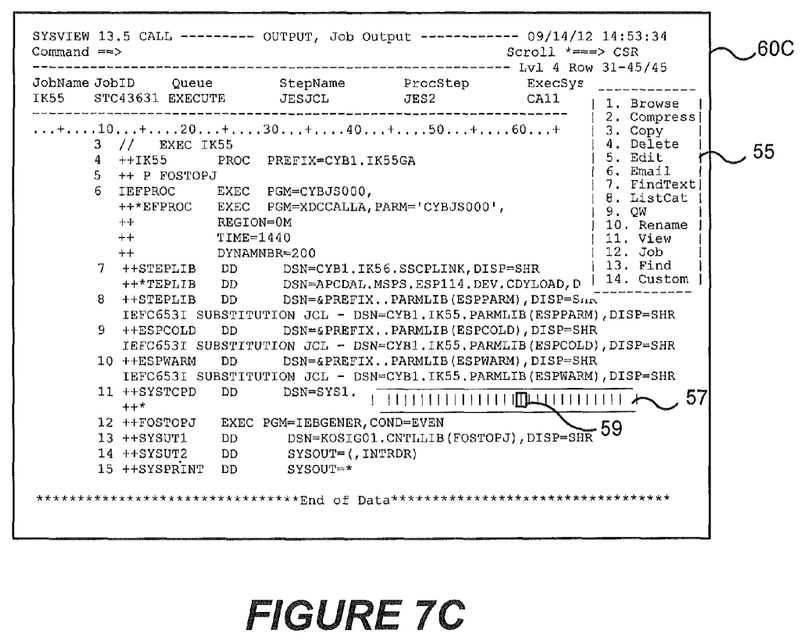
Figure 7D:
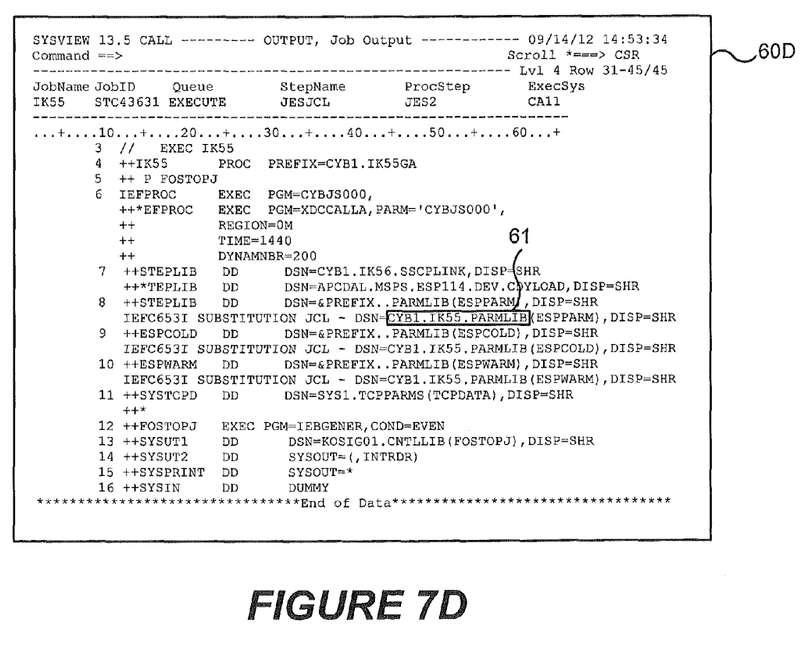

This operation is illustrated in FIGS. 7A-7D, which illustrate sample screenshots 60A-60D according to some embodiments. Referring to FIG. 7A, a user may wish to find occurrences of the string "CYBLIK55.PARMLIB". In that case, the user may place the cursor on the first character of one instance of the string (i.e., "C") and invoke the tool. When the selection menu 55 is displayed, the user may select the option "13. Find". Referring to FIG. 7B, a graphic scale 57 may be placed under line containing the selected character. The scale 57 starts at the same horizontal position as the selected character in the supervening line. Referring to FIG. 7C, the user may click on the scale separator 59 corresponding to the last character of the target string (i.e., "B"). Referring to FIG. 7D, the system highlights the first occurrence 61 of the target string. The next occurrence of the string can then be found by invoking the "re-find" command, which is usually assigned to PF5 in ISPF.

Figure 5:
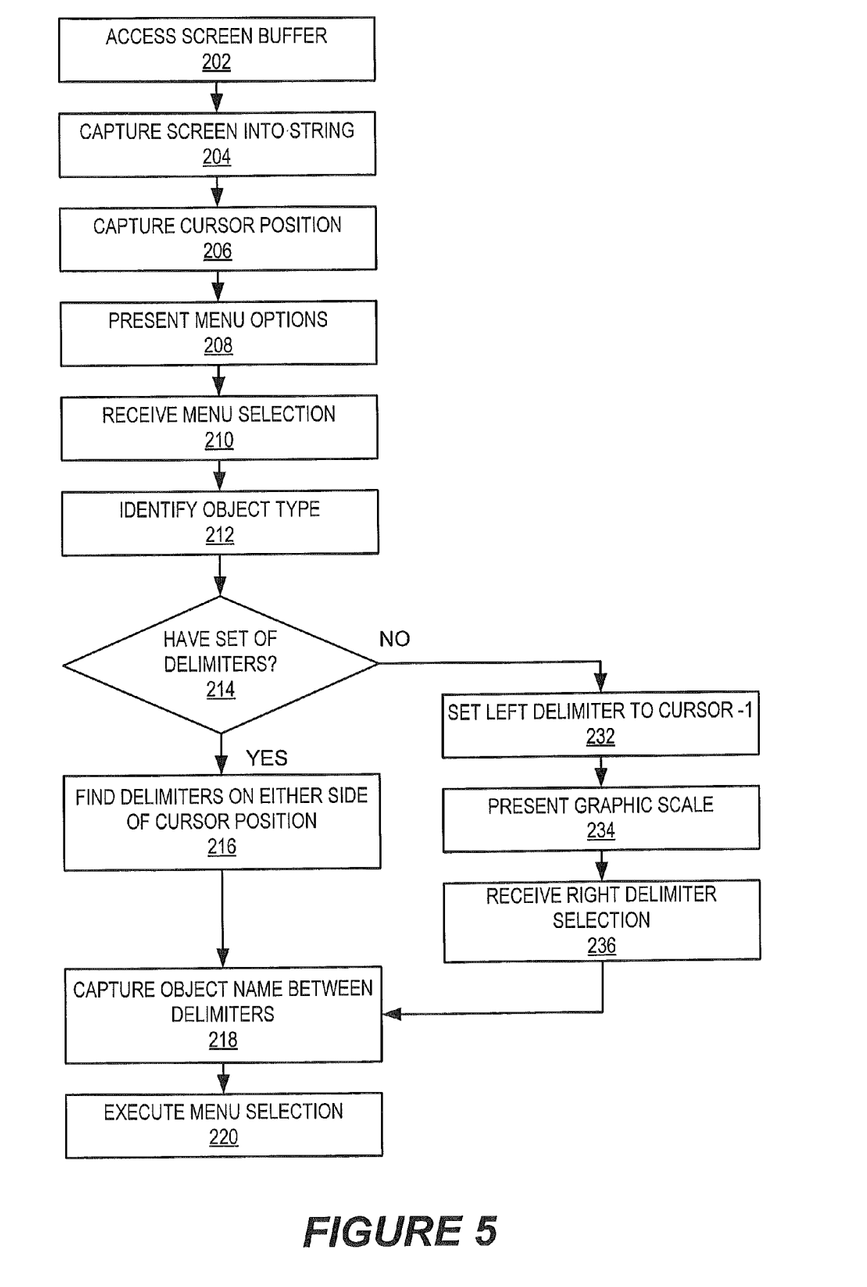

Further embodiments are illustrated in FIG. 5. As shown therein, the systems/methods may include: accessing a screen buffer (block 202) and capturing the entire screen into a temporary string (block 204). The cursor position is captured (block 206) and a menu of options is presented to the user (block 208). A menu selection is received (block 210). The object type may be determined based on the menu selection made (block 212). The systems/methods then find delimiters on either side of cursor. This is done by determining if a set of applicable delimiters is already known (block 214). If so, the delimiters are identified on either side of the cursor position (block 216), and the object between the delimiters is captured (block 218). The menu selection is then executed on the object (block 220).

If the delimiters are not known at block 214, the systems/methods set the left delimiter to be the character immediately to the left of the cursor (cursor −1) (block 232) and present a graphic scale to the user as described above (block 234). The systems/methods then receive the delimiter selection (block 236) and then continue to block 218 to capture the object between the delimiters and execute the menu selection against the object (block 220).

Figure 6:
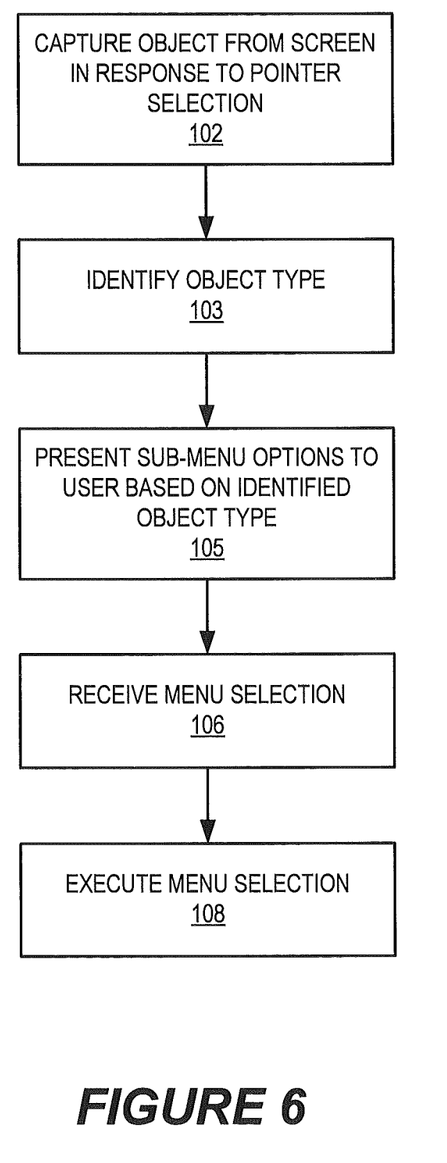

Referring to FIG. 6, object type information may be used to generate a custom menu based on the type of object that is selected. For example, the embodiments may capture an object from the screen in response to a pointer selection (block 102) using one or more of the methods discussed above. The object type may be identified, for example, based on an initial menu selection, by comparing the selected object to a list of known objects, or by some other method (block 103).

The embodiments may then present a menu of options to the user that is based on the identified object type (block 105). For example, a menu generated that includes actions for processing a data set may include options such as "Browse" or "Delete," but may not include an option such as "QW", which, as noted above applies only to Message objects.

The embodiments then receive a menu selection (block 106) and execute the menu selection against the selected object (block 108).

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving a block of text;
   displaying the block of text on a terminal window as a displayed block of text, wherein a size of the block of text is equal to a screen size of the terminal window;
   presenting a selection cursor on the displayed block of text at a cursor location on the terminal window;
   receiving a cursor selection signal while the selection cursor is positioned at the cursor location;
   presenting a menu including menu options corresponding to available actions;
   receiving a command corresponding to a selected one of the menu options;
   identifying, within the displayed block of text, a text object associated with the cursor location that is smaller than the displayed block of text; and
   executing the selected one of the menu options on the text object.

2. The method of claim 1, wherein identifying the text object associated with the cursor location comprises:
   reading first characters in the block of text from the cursor location toward a beginning of the block of text until a first delimiter character is found; and
   reading second characters in the block of text from the cursor location toward an end of the block of text until a second delimiter character is found, wherein the first delimiter character and the second delimiter character define the text object in the block of text between the first delimiter character and the second delimiter character.

3. The method of claim 1, further comprising:
   determining that no text object is associated with the cursor location;
   parsing the block of text to identify one or more candidate text objects having predetermined text object characteristics within the block of text; and
   highlighting the one or more candidate text objects on the terminal window.

4. The method of claim 1, further comprising:
   identifying a type of the text object;
   wherein presenting the menu comprises presenting a sub-menu that includes sub-menu options corresponding to second actions that can be taken with respect to the identified type of text object.

5. The method of claim 1, further comprising:
   identifying a type of the text object in response to the command.

6. The method of claim 1, wherein the block of text comprises a screen of text.

7. The method of claim 1, comprising:
   identifying a type of the text object;
   determining if the selected one of the menu options corresponds to a type of action that can be taken with respect to the type of the text object; and
   in response to determining that the selected one of the menu options does not correspond to a type of action that can be taken with respect to the type of the text object, displaying an error message on the terminal window.

8. The method of claim 1, further comprising:
   in response to receiving the command, setting a first character immediately preceding a character corresponding to the cursor location as a first delimiter; and
   setting a second character that is beyond the cursor location as a second delimiter.

9. The method of claim 8, further comprising:
   displaying a graphic scale in relation to the cursor location; and
   receiving a user input on the graphic scale indicative of a location of the second delimiter.

10. A computer program product, comprising:
    a non-transitory computer readable storage medium having computer readable program code embodied in the medium, the computer readable program code comprising:
    computer readable program code configured to receive a block of text;
    computer readable program code configured to display the block of text on a terminal window as a displayed block of text, wherein a size of the block of text is equal to a screen size of the terminal window;

computer readable program code configured to present a selection cursor on the displayed block of text at a cursor location on the terminal window;

computer readable program code configured to receive a cursor selection while the selection cursor is positioned at the cursor location;

computer readable program code configured to present a menu including menu options corresponding to available actions;

computer readable program code configured to receive a command corresponding to a selected one of the menu options;

computer readable program code configured to identify, within the displayed block of text, a text object associated with the cursor location that is smaller than the displayed block of text; and computer readable program code configured to execute the selected one of the menu options on the text object.

11. The computer program product of claim 10, wherein the computer readable program code configured to identify the text object associated with the cursor location comprises:

computer readable program code configured to read first characters in the block of text from the cursor location toward a beginning of the block of text until a first delimiter character is found; and computer readable program code configured to read second characters in the block of text from the cursor location toward an end of the block of text until a second delimiter character is found, wherein the first delimiter character and the second delimiter character define the text object in the block of text between the first delimiter character and the second delimiter character.

12. The computer program product of claim 10, further comprising:

computer readable program code configured to determine that no text object is associated with the cursor location;

computer readable program code configured to parse the block of text to identify one or more candidate text objects having predetermined text object characteristics within the block of text; and computer readable program code configured to highlight the one or more candidate text objects on the terminal window.

13. The computer program product of claim 10, further comprising:

computer readable program code configured to identify a type of the text object;

wherein the computer readable program code configured to present the menu comprises computer readable program code configured to present a sub-menu that includes sub-menu options corresponding to second actions that can be taken with respect to the identified type of text object.

14. The computer program product of claim 10, wherein the block of text comprises a screen of text.

15. The computer program product of claim 10, further comprising:

computer readable program code configured to determine a type of the text object;

computer readable program code configured to determine if the selected one of the menu options corresponds to a type of action that can be taken with respect to the type of the text object; and computer readable program code configured, in response to determining that the selected one of the menu options does not correspond to a type of action that can be taken with respect to the type of the text object, to display an error message on the terminal window.

16. The computer program product of claim 10, comprising:

computer readable program code configured to identify a type of the text object;

computer readable program code configured to determine if the selected one of the menu options corresponds to an action that can be taken with respect to the type of the text object; and computer readable program code configured, in response to determining that the selected one of the menu options does not correspond to an action that can be taken with respect to the type of the text object, to display an error message on the terminal window.

17. The computer program product of claim 10, further comprising:

computer readable program code configured, in response to receiving the command, to set a first character immediately preceding a character corresponding to the cursor location as a first delimiter; and computer readable program code configured to set a second character that is beyond the cursor location as a second delimiter.

18. The computer program product of claim 17, further comprising:

computer readable program code configured to display a graphic scale in relation to the cursor location; and computer readable program code configured to receive a user input on the graphic scale indicative of a location of the second delimiter.

19. A computer terminal comprising:

a processor;

a memory coupled to the processor;

a display coupled to the processor; and a terminal emulator module stored in the memory, wherein the terminal emulator module is configured to receive a block of text from a remote server, to display the block of text on a terminal window on the display as a displayed block of text wherein a size of the block of text is equal to a screen size of the terminal window, to present a selection cursor on the displayed block of text at a cursor location on the terminal window, to receive a cursor selection while the selection cursor is positioned at the cursor location, to present a menu including menu options on the terminal window, to receive a command corresponding to a selected one of the menu options, to identify, within the displayed block of text, a text object associated with the cursor location that is smaller than the displayed block of text, and to execute the selected one of the menu options on the text object.

20. The computer terminal of claim 19, wherein the terminal emulator module is further configured to read first characters in the block of text from the cursor location toward a beginning of the block of text until a first delimiter character is found, and to read second characters in the block of text from the cursor location toward an end of the block of text until a second delimiter character is found, wherein the first delimiter character and the second delimiter character define the text object in the block of text between the first delimiter character and the second delimiter character.

* * * * *